US012241387B1

(12) United States Patent
Liles et al.

(10) Patent No.: US 12,241,387 B1
(45) Date of Patent: Mar. 4, 2025

(54) TILTED CMC VANE ARC SEGMENT

(71) Applicant: RTX CORPORATION, Farmington, CT (US)

(72) Inventors: Howard J. Liles, Newington, CT (US); Cheng Gao, South Glastonbury, CT (US); Bryan P. Dube, Chepachet, RI (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/455,293

(22) Filed: Aug. 24, 2023

(51) Int. Cl.
*F01D 5/28* (2006.01)

(52) U.S. Cl.
CPC ............. *F01D 5/282* (2013.01); *F01D 5/284* (2013.01); *F05D 2240/12* (2013.01); *F05D 2300/6033* (2013.01)

(58) Field of Classification Search
CPC . F01D 5/141; F01D 5/14; F01D 5/147; F01D 9/04; F01D 9/02; F05D 2240/12
See application file for complete search history.

(56) References Cited

U.S. PATENT DOCUMENTS

| | | | | |
|---|---|---|---|---|
| 7,510,371 | B2 | 3/2009 | Orlando et al. | |
| 8,998,575 | B2 * | 4/2015 | Lucashu | F01D 9/04 415/190 |
| 9,011,085 | B2 * | 4/2015 | Suciu | F01D 9/041 29/889.22 |
| 10,408,227 | B2 * | 9/2019 | Bailey | F02K 3/06 |
| 10,801,516 | B2 * | 10/2020 | Montes Parra | F01D 5/141 |
| 2008/0159856 | A1 | 7/2008 | Moniz et al. | |

* cited by examiner

*Primary Examiner* — Michael L Sehn
(74) *Attorney, Agent, or Firm* — Carlson, Gaskey & Olds, P.C.

(57) ABSTRACT

An article includes a ceramic matrix composite (CMC) vane arc segment for disposal about an engine central axis. The CMC vane arc segment includes first and second platforms and an airfoil section that extends therebetween. The airfoil section defines a radial stacking axis that is oblique to a Z-axis that is perpendicular to the engine central axis such that the radial stacking axis forms a non-zero angle with the Z-axis.

11 Claims, 2 Drawing Sheets

TILTED CMC VANE ARC SEGMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An article according to an example of the present disclosure includes a ceramic matrix composite (CMC) vane arc segment for disposal about an engine central axis. The CMC vane arc segment has first and second platforms and an airfoil section extending therebetween. The airfoil section defines a radial stacking axis that is oblique to a Z-axis that is perpendicular to the engine central axis such that the radial stacking axis forms a non-zero angle with the Z-axis.

In a further embodiment of any of the foregoing embodiments, the radial stacking axis is a linear axis that passes through all centroids of all axial cross-sections of the airfoil section and that intersects the engine central axis.

In a further embodiment of any of the foregoing embodiments, the airfoil section has an axial tilt.

In a further embodiment of any of the foregoing embodiments, the airfoil section includes radially inner and outer ends and a leading edge, and the leading edge at the radially outer end is aft of the leading edge at the radially inner end.

In a further embodiment of any of the foregoing embodiments, at least one fiber ply in the CMC vane arc segment extends from the airfoil section, through a fillet, and into the second platform.

In a further embodiment of any of the foregoing embodiments, the airfoil section has a circumferential lean.

In a further embodiment of any of the foregoing embodiments, the airfoil section includes radially inner and outer ends and a leading edge, and the leading edge at the radially outer end is circumferentially offset from the leading edge at the radially inner end.

In a further embodiment of any of the foregoing embodiments, the airfoil section has an axial tilt and a circumferential lean.

In a further embodiment of any of the foregoing embodiments, the airfoil section has at least one of an axial tilt or a circumferential lean and the non-zero angle is from 15° to 45°.

In a further embodiment of any of the foregoing embodiments, a gas turbine engine includes a turbine section that has a plurality of the CMC vane arc segments.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
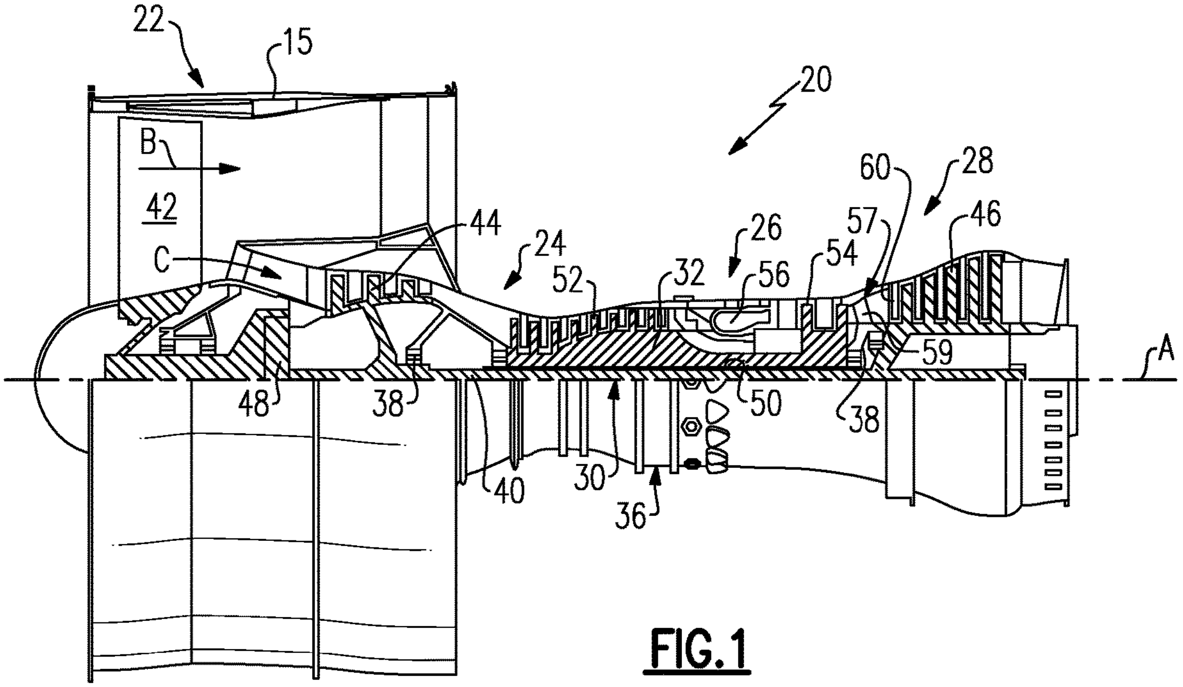
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram}°\ \text{R})/(518.7°\ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
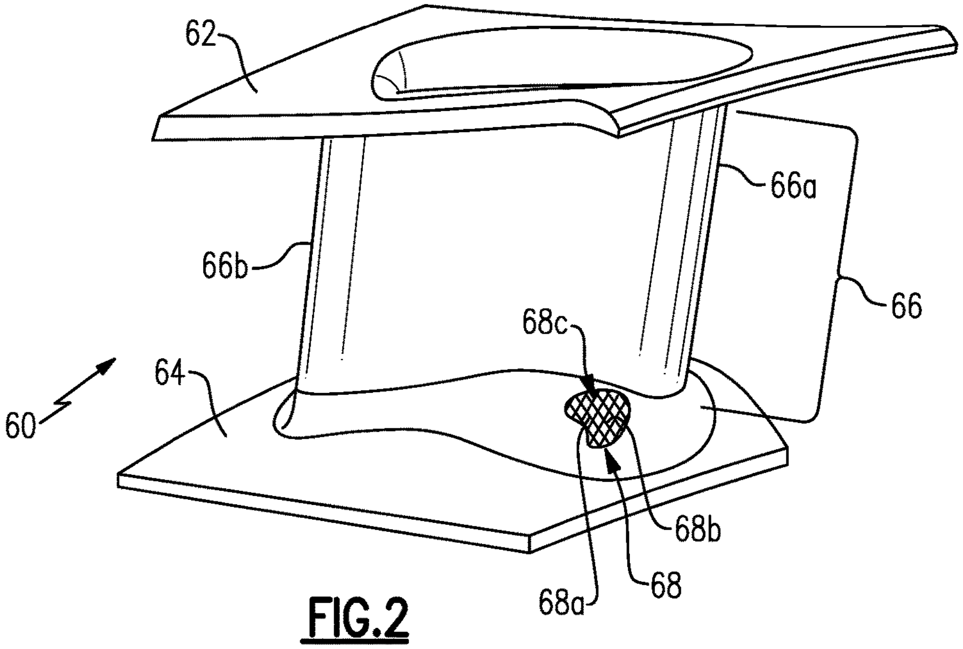
FIG. 2 illustrates a vane arc segments of the engine.
Figure 3:
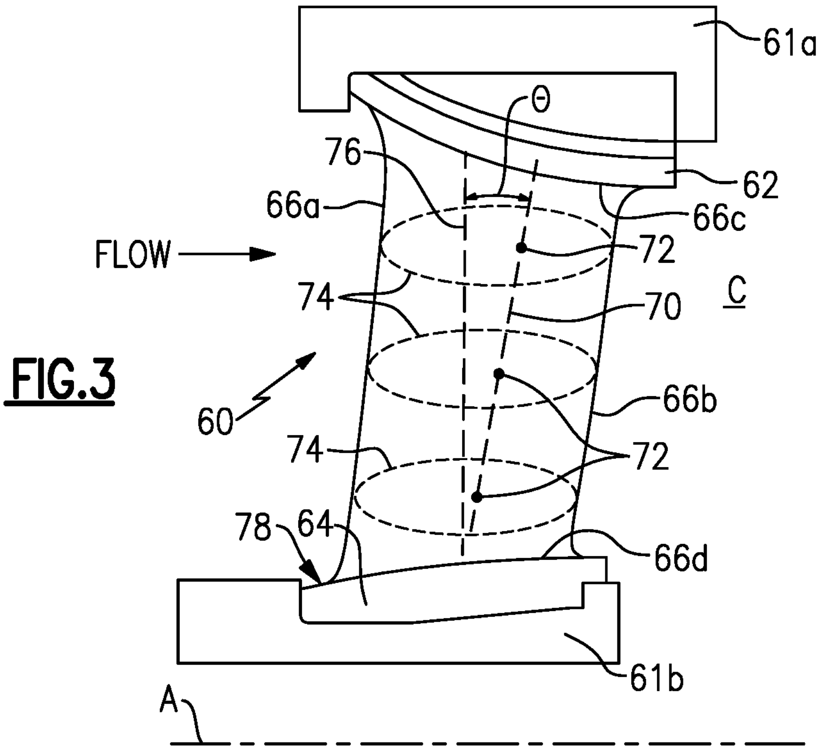
FIG. 3 illustrates a view of the vane arc segment and radial supports.

FIG. 2 illustrates a representative article in the form of a vane arc segment 60 from the turbine section 28 of the engine 20. Multiple vane arc segments 60 are situated in a circumferential row about the engine central axis A. FIG. 3 illustrates a circumferential view of the vane 60 supported between outer and inner radial supports 61*a*/61*b* in a ring-strut-ring configuration.

Each vane arc segment 60 is comprised of several sections, including first and second platforms 62/64 and an airfoil section 66 that extends between the platforms 62/64. The airfoil section 66 in this example is hollow and defines a leading edge 66*a*, a trailing edge 66*b*, pressure and suction sides (unnumbered), and radially outer and inner ends 66*c*/66*d*. In this example, the first platform 62 is a radially outer platform and the second platform 64 is a radially inner platform. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The vane arc segments 60 are formed of a ceramic matrix composite (CMC) 68. Referring to the cutaway section in FIG. 2, the CMC 68 includes ceramic fibers 68*a* that are disposed in a ceramic matrix 68*b*. The CMC 68 may be, but is not limited to, a SiC/SiC composite in which SiC fibers are disposed within a SiC matrix. The ceramic fibers 68*a* are provided in fiber plies 68*c* that may be woven or braided and may collectively include plies of different fiber weave configurations.

Vane arc segments are subject to aerodynamic and other loads during engine operation. The loads are transmitted to the radial supports. The vane arc segments 60 are designed for a cross-corner loading scheme. In such a configuration, the aerodynamic load vector is transmitted through a leading corner of the platform 64 and a circumferentially opposed trailing corner of the platform 62. Such a loading scheme can create bending in the vane and resultant stresses at the fillets between the platforms and the airfoil section. Those stresses are generally undesirable and can be reduced by increasing the thickness of the airfoil wall at the fillet and/or by increasing the radius of curvature of the fillets. However, particularly for vanes of very small size, increasing thickness and radius may be insufficient to reduce stresses to desired levels. Moreover, large radius fillets may debit aerodynamic performance, challenge space constraints within the envelope of the platforms, and/or challenge manufacturability of CMCs. In these regards, as will be discussed in more detail below, the airfoil sections 66 of the vane arc segments 60 herein are configured to be at an angle so that bending stress is reduced and at least a portion of the bending stress manifests as compressive stress, which is more favorable for CMC strength.

As shown in FIG. 3, the airfoil section 66 defines a radial stacking axis 70. The radial stacking axis 70 is a linear axis that passes through all centroids 72 of all axial cross-sections 74 along the span of the airfoil section 66 and that intersects the engine central axis A (superimposed in FIG.

3). The radial stacking axis 70 is oblique to a Z-axis 76 that is perpendicular to the engine central axis A such that the radial stacking axis 70 forms a non-zero angle θ (theta) with the Z-axis 76 (without the engine 20 running). For example, the angle θ (theta) may be an axial angle, a circumferential (tangential) angle, or a compound axial and circumferential angle. In a further example, the angle θ (theta) is an axial angle or a circumferential angle and is from 15° to 45°. In one example of a compound angle, the angle θ (theta) has an axial angle component that is from 15° to 45° and a circumferential angle component that is from 15° to 45°.

The angle θ (theta) serves to create a "pre-tilt" (for an axial angle) and/or a "pre-lean" (for a circumferential angle) in the airfoil section 66 such that when the engine 20 is in operation, the radial stacking axis 70 more closely aligns with the aerodynamic load vector. The aerodynamic load vector can be determined through testing and/or simulation and is well-understood by those of ordinary skill in the art. For example, due to the ring-strut-ring mounting configuration, the inner support 61*b* translates aft and the axial load is reacted out radially through the vane arc segment 60. This results in compression through the airfoil section 66 along the stacking axis 70 instead of bending at the platform/airfoil fillet, which is a more favorable stress condition for ceramics (which are generally strong in compression).

In the illustrated example of FIG. 3, the airfoil section 66 has an axial tilt. For instance, the leading edge 66*a* of the airfoil section 66 at the radially outer end 66*c* is forward of the leading edge 66*a* at the radially inner end 66*d*. In another example shown in FIG. 4, the airfoil section 66 has a circumferential lean in which the leading edge 66*a* at the radially outer end 66*c* is circumferentially offset from (aft of) the leading edge 66*a* at the radially inner end 66*d*. In a further example, the angle θ (theta) is a compound angle such that it has both axial and circumferential components as in the examples above.

Figure 4:
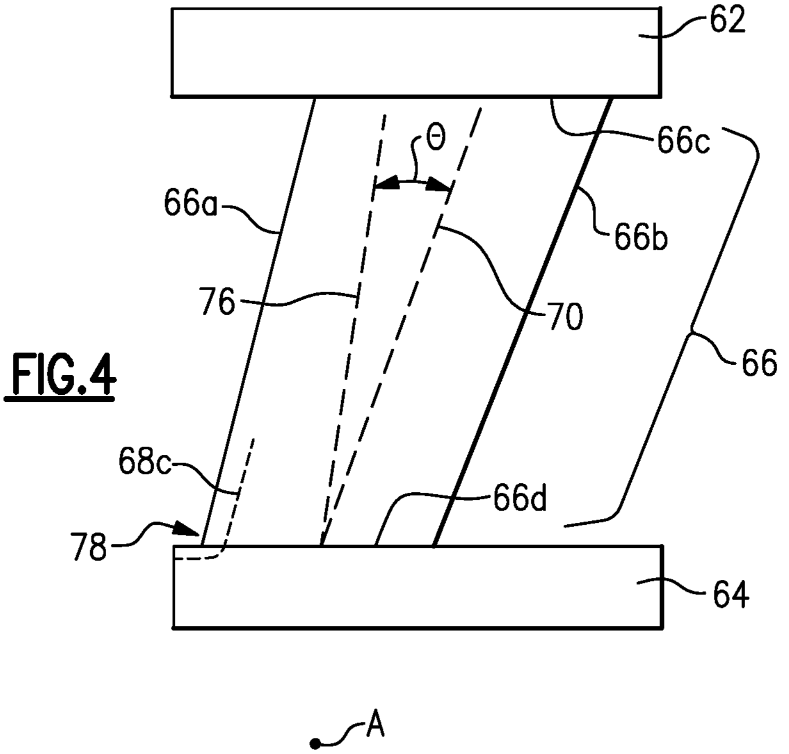
FIG. 4 illustrates a vane arc segment with a circumferential lean.

The vane arc segment 60 may be fabricated via a lay-up of the fiber plies 68*c*, but is not limited to such a process. For example, fiber plies 68*c* are laid-up to form a fiber preform for the airfoil section 66 and platforms 62/64. The preform is then densified with the ceramic matrix, such as by chemical vapor infiltration (CVI), melt infiltration (MI), and/or polymer infiltration and pyrolysis (PIP). The tilt may facilitate fabrication, particularly at the fillet between the leading edge 66*a* of the airfoil section 66 and the platform 64. For example, the angle θ (theta) requires less "extreme" bending of the fibers in the fillet, thereby facilitating the lay-up process and avoiding the minimum bending radius of the fiber ply or plies. For instance, as shown in FIG. 4, at least one of the fiber plies 68*c* extends continuously from the airfoil section 66, through the fillet 78 at the leading edge 66*a*, and into the forward portion of the platform 64. The tilting may also provide a larger reaction wheelbase for the cross corner loading and shorten the wheelbase of the platform that is bending and creating stress, which may reduce compressive and tensile stresses.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:

a ceramic matrix composite (CMC) vane arc segment for disposal about an engine central axis, the CMC vane arc segment including first and second platforms and an airfoil section extending therebetween, the airfoil section defining a radial stacking axis that is oblique to a Z-axis that is perpendicular to the engine central axis such that the airfoil section has a circumferential lean in which the radial stacking axis forms a circumferential non-zero angle with the Z-axis, the radial stacking axis is a linear axis that passes through all centroids of all axial cross-sections of the airfoil section and that intersects the engine central axis; and outer and inner radial supports between which the CMC vane arc segment is mounted so as to form a ring-strut-ring configuration, the first platform is a radially outer platform, the second platform is a radially inner platform, and wherein the CMC vane arc segment defines an aerodynamic load vector that is transmitted through a leading end corner of the inner platform and a circumferentially opposed trailing end corner of the outer platform.

2. The article as recited in claim 1, wherein the airfoil section has an axial tilt.

3. The article as recited in claim 2, wherein the airfoil section includes radially inner and outer ends and a leading edge, and the leading edge at the radially outer end is aft of the leading edge at the radially inner end.

4. The article as recited in claim 2, wherein at least one fiber ply in the CMC vane arc segment extends from the airfoil section, through a fillet, and into the second platform.

5. The article as recited in claim 1, wherein the airfoil section includes radially inner and outer ends and a leading edge, and the leading edge at the radially outer end is circumferentially offset from the leading edge at the radially inner end.

6. The article as recited in claim 1, wherein the circumferential non-zero angle is from 15° to 45°.

7. A gas turbine engine comprising:

a compressor section;

a combustor in fluid communication with the compressor section; and a turbine section in fluid communication with the combustor, the turbine section including:

a plurality of ceramic matrix composite (CMC) vane arc segments disposed about an engine central axis, each of the CMC vane arc segments including first and second platforms and an airfoil section extending therebetween, the airfoil section defining a radial stacking axis that is tilted with respect to a Z-axis that is perpendicular to the engine central axis such that the airfoil section has a circumferential lean in which the radial stacking axis forms a circumferential non-zero angle with the Z-axis, the radial stacking axis is a linear axis that passes through all centroids of all axial cross-sections of the airfoil section and that intersects the engine central axis;

outer and inner radial supports between which the CMC vane arc segments are mounted so as to form a ring-strut-ring configuration, the first platform is a radially outer platform, the second platform is a radially inner platform, and wherein each of the CMC vane arc segments defines an aerodynamic load vector that is transmitted through a leading end corner of the inner platform and a circumferentially opposed trailing end corner of the outer platform.

8. The gas turbine engine as recited in claim 7, wherein the airfoil section has an axial tilt.

9. The gas turbine engine as recited in claim 8, wherein the airfoil section includes radially inner and outer ends and a leading edge, and the leading edge at the radially outer end is aft of the leading edge at the radially inner end.

10. The gas turbine engine as recited in claim 7, wherein the airfoil section includes radially inner and outer ends and a leading edge, and the leading edge at the radially outer end is circumferentially offset from the leading edge at the radially inner end.

11. The gas turbine engine as recited in claim 7, wherein the circumferential non-zero angle is from 15° to 45°.

* * * * *